Patented Sept. 22, 1936

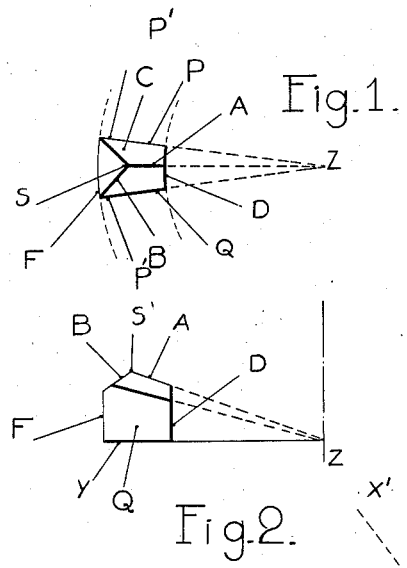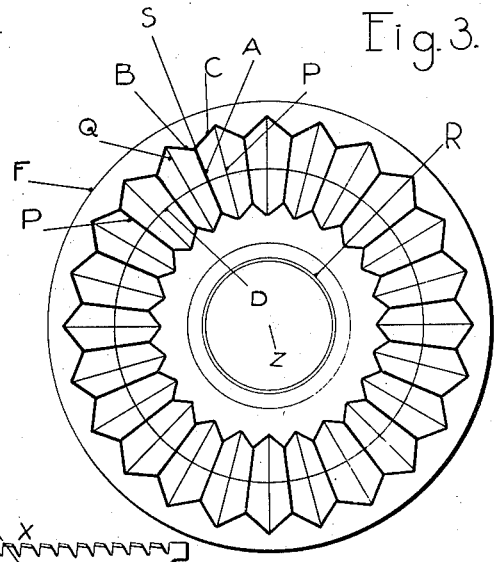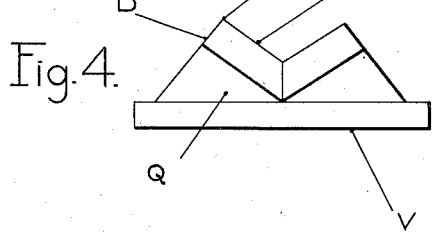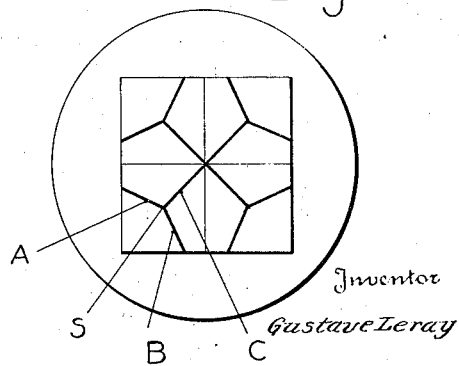

2,055,298

UNITED STATES PATENT OFFICE 2,055,298

LIGHT REFLECTOR

Gustave Leray, Paris, France

Application December 29, 1933, Serial No. 704,535
In France December 31, 1932

4 Claims. (Cl. 88—78)

The object of the present invention is to provide reflecting elements adapted to be placed in juxtaposed relation in order to constitute a reflecting surface having no discontinuities and which is bounded by any forms of curves (letters, signals, etc.).

It is well-known that three reflecting mirrors arranged to form a trirectangularly trihedral angle, that is to say forming two by two dihedral angles of 90°, form a reflector capable of reflecting back in a parallel direction any incident luminous rays.

It is likewise known, and is described in various text books on optics, that the three reflecting mirrors may be constituted by specular reflecting surfaces (separate mirrors or hollow trihedral elements) or by totally reflecting surfaces (glass block or trihedral elements in relief).

A further object of the present invention is to constitute a reflecting element by the solid formed by the intersection of a trirectangularly trihedral element, one or more cones, planes parallel to or substantially parallel to the axis of the trihedral element, and a plane perpendicular to or substantially perpendicular to said axis, such elements being so arranged that the base plan of the reflecting element takes the form of a quadrilateral, two sides of which are straight while the other two are formed by curved portions.

The cones may be cones of revolution, their axes being parallel to that of the trihedral element and, in the limit, these cones may be replaced by cylinders whose axis is likewise parallel to the axis of the trihedral element (the axis of the trihedral element being the intersection of the bisecting planes).

The form of the generatrix which determines said cones or cylinders will be that of the curves which limit the reflecting surface. It obviously follows that if the curve which limits the reflecting surface is a straight line, the conical or cylindrical surfaces are reduced to planes. In all the various forms which the elementary solid according to the invention may assume, it forms an irregular polyhedron having eight actual faces, that is to say without counting as faces any planes that may be formed by truncating certain apices or edges.

Another object of the present invention is to replace one of the plane faces of the trihedral element by a portion of a conical surface to which the replaced plane face would be tangential.

In the accompanying drawing:

Fig. 1 is a plan view of a reflecting element adapted to be juxtaposed alongside another.

Fig. 2 illustrates the same element in elevation.

Fig. 3 illustrates a plan view of a reflector constituted by the assemblage of reflecting elements, as illustrated in the preceding figures and which occupy the space comprised between two concentric circles.

Figs. 4 to 7 illustrate two modifications wherein the reflecting surface is bounded by straight lines.

Fig. 8 illustrates a further modification.

Figs. 4 and 6 illustrate in elevation and plan view respectively an assemblage of rectangular elements the apex of each of which can be projected on to the centre of the rectangle, while one edge of the trihedral element is parallel to one side of said rectangle.

Figs. 5 and 7, illustrate in elevation and plan view respectively a modification of the embodiment disclosed in Figs. 4 and 6, according to which modification the apex of the trihedral element projects on to the centre of a square base, while one of the edges of the trihedral element passes through one of the vertices of the square.

Referring in the first place to the embodiment illustrated in Figs. 1 to 3, it will be seen that the reflecting element is essentially constituted by a trirectangularly trihedral element of which S is the apex and A, B and C are the edges. The axis about which the various elements are arranged is shown at Z.

The edge A intersects the axis Z as do likewise the planes P and Q which bound the faces AB and AC. At D and F the reflector is bounded by cylindrical portions whose generatrix must assume the form of the reflecting surface. Hence the surfaces D and F will be constituted by cylinders of revolution having Z for their axis.

The face BC of the trihedral element may be a plane surface but, in accordance with the invention, it may likewise be constituted by a portion of the surface of a cone of revolution having Z as axis and to which the plane containing the edges B and C would be tangential.

One of the results obtained by thus replacing one of the three plane faces of each trirectangularly trihedral element by a conical element is to make the reflector slightly divergent, that is to say an incident parallel beam is reflected back in the form of a divergent beam whereby the range of visibility is increased.

The portion of the reflector on which the light falls is constituted by a plane perpendicular to the axis Z. The trace of this plane is shown in Fig. 2 and is designated Y.

It will be observed that the projection of the element according to the invention on a plane perpendicular to the axis Z appears as a circular sector bounded by the traces of the planes P and Q and the traces of the cylinders D and F.

This formation enables the elements to be placed in juxtaposed relation in the form of a ring without leaving any free space between them. This process of assemblage enables a reflecting surface to be formed which has no discontinuities and such assemblage has been illustrated in Fig. 3. In the assemblage illustrated in Fig. 3, the trihedral elements are formed out of a single block and hence the edges P' of the conical face F BC illustrated in Fig. 1 disappear in the mounting of Fig. 3.

The arrangement of Fig. 3 enables a lens or circular striations to be placed in the empty central space and such a lens has been designated by the reference letter R.

The device according to the invention may have numerous applications and in particular it may be used as a glass of the rear lamp for motor vehicles. The device, which acts as a perfect reflector in the case of a light source situated in front, even at an infinite distance, on the contrary lets through a considerable fraction of the luminous rays emitted by the source if the latter is located at a small distance from the device and in the rear thereof.

Should it be desired to change the form of the total reflecting surface, the cylindrical elements D and F will no longer have a circular base, but while their generatrices will be substantially parallel to the axis of the trihedral element, their right section will assume the form of the curve limiting the reflecting surface.

The planes P and Q will then be perpendicular to said curve.

In the embodiments of the reflecting elements illustrated in Figs. 4 to 7, the axis Z is removed to infinity. Hence each reflecting element is constituted by a trirectangularly trihedral element of which S is the apex, and A, B, C the edges, while its faces are limited by four planes forming a prism having a rectangular or square base.

The reflecting elements may be mounted on a flat base V to which the aforesaid four planes may be perpendicular. The bounding planes of all the trihedral elements are parallel to each other, taken two by two.

By juxtaposing the trirectangularly trihedral elements a unit is obtained having identical properties to those of a single trirectangularly trihedral element having the same surface area as that of the base V.

The projection of the various trihedral elements on the base V which limits said trihedral element in front forms a checker-board composed of identical rectangular or square elements.

The projection of the apex S of each trirectangularly trihedral element falls within the rectangle or square either at the center of said figure or at a point offset therefrom.

The axis of each trirectangularly trihedral element (intersection of the bisecting planes of the dihedral angles of the trihedral element) may be parallel to the perpendicular to the front plane V or slightly inclined to said perpendicular.

It is evident that the reflectors which may be joined together without discontinuity may form a block between themselves and with their support as has been illustrated in Figs. 3, 6, and 7.

The unit may be formed by moulding a single block from a transparent material which may be coloured or not.

In this case the conical portions of each element mate together without discontinuity to form a portion of the surface of a circular cone and the divergence will be all the greater as said conical surface is more curved.

If considered desirable, the faces of the trihedral element may be silvered, whereby the range of visibility of the reflector is considerably increased.

According to another modification of the invention, the reflecting element may take the form of a metallic reflecting surface which may be silvered, chromed or treated in any other equivalent manner, said metallic surface reproducing in hollow form the coupling of the trihedral elements which characterizes the invention.

When the reflector is to be viewed at a given angle the axes of the trihedral elements may be inclined relatively to the face Y of Fig. 3 and V of Fig. 4 so as to obtain a maximum efficiency at the given angle.

Such an arrangement has been illustrated in Fig. 8 in which XX' is the axis of a trihedral element and WW' the direction of the incident and reflected rays for maximum efficiency at a given angle.

It will not be outside the scope of the present invention to make slight modifications of detail, such as slightly deforming certain of the plane faces, truncating the edges or apices, or silvering the totally reflecting surfaces so as to increase the field of view of the device.

The device constructed in accordance with the present invention may be used for night signalling and will appear luminous to a distant observer situated practically facing the apparatus and alongside a luminous source. For example the observer in question might be the driver of a motor vehicle whose headlights are lit.

I claim:

1. An annular light reflector unit comprising a plurality of reflectors each formed by the intersection of a trirectangularly trihedral element, one of the reflecting faces of which is conical, and two cylindrical surfaces having a common axis and forming the ends of the element, said conical and cylindrical surfaces of the elements mating without discontinuity with the similar surfaces of adjacent elements to form a ring, and a lens member mounted in the inner central portion of said ring.

2. An annular reflector comprising a plurality of trirectangular trihedral units formed together in a plurality of concentric rings each unit comprising three reflecting surfaces, one being curved, and having a base bounded by two opposite curved surfaces, their common axis being the center of the reflector, and two opposite plane surfaces converging radially towards the axis of the reflector, said converging plane surfaces engaging similar plane surfaces of adjacent units, said curved reflecting surface joining with the similar curved reflecting surfaces of adjoining units to form a continuous annular reflecting surface.

3. An annular reflector comprising a plurality of trirectangular trihedral units formed together in a plurality of concentric rings each unit comprising three reflecting surfaces, one being curved, and having a base bounded by two opposite curved surfaces, their common axis being the center of the reflector, and two opposite plane surfaces converging radially towards the axis of the reflector, said converging plane surfaces engaging similar plane surfaces of adjacent units, said curved reflecting surface joining with the similar curved reflecting surfaces of adjoining units to form a continuous annular surface, each unit of one ring being radially aligned with and oppositely disposed to the abutting unit of the next adjacent ring.

4. An annular reflector comprising a plurality of trirectangular trihedral units jointed together in a ring, each unit comprising three reflecting surfaces, one being curved, and having a base bounded by two opposite curved surfaces, their common axis being the center of the reflector, and two opposite plane surfaces converging radially toward the axis of the reflector, said converging plane surfaces engaging similar plane surfaces of adjacent units, said curved reflecting surface joining with the similar curved reflecting surfaces of adjoining units to form a continuous annular reflecting surface.

GUSTAVE LERAY.